United States Patent [19]
Randolph

[11] Patent Number: 5,691,914
[45] Date of Patent: Nov. 25, 1997

[54] FLUID FLOW MEASUREMENT CORRECTING SYSTEM, AND METHODS OF CONSTRUCTING AND UTILIZING SAME

[75] Inventor: Gary Randolph, Lyndonville, N.Y.

[73] Assignee: American Sigma, Inc., Medina, N.Y.

[21] Appl. No.: 685,502

[22] Filed: Jul. 24, 1996

[51] Int. Cl.⁶ ............................................. G01F 5/60
[52] U.S. Cl. .................. 364/510; 364/509; 73/861; 73/861.52; 73/861.53; 73/861.65; 73/861.02; 73/861.21; 73/170.11; 239/DIG. 3
[58] Field of Search ................ 364/496, 505, 364/506, 509, 510; 73/53.01, 54.01, 54.04, 54.09, 215, 861, 861.42, 861.52, 861.53, 861.01, 861.02, 861.18, 861.21, 861.22, 861.61, 861.65, 170.01, 170.11, 170.14, 299, 302, 861.24, 861.28, 861.27, 861.39; 239/DIG. 3

[56] References Cited

U.S. PATENT DOCUMENTS

| | | | |
|---|---|---|---|
| 3,638,490 | 2/1972 | Buettner | 73/861.65 |
| 4,069,101 | 1/1978 | Mangus | 176/65 |
| 4,083,246 | 4/1978 | Marsh | 73/227 |
| 4,121,661 | 10/1978 | Redford | 166/252 |
| 4,324,291 | 4/1982 | Wong et al. | 166/252 |
| 4,331,025 | 5/1982 | Ord | 73/54.01 |
| 4,393,451 | 7/1983 | Barker | 364/510 |
| 4,458,529 | 7/1984 | Hatsuo et al. | 73/204.18 |
| 4,653,321 | 3/1987 | Cunningham et al. | 73/197 |
| 4,807,201 | 2/1989 | Fryda et al. | 367/99 |
| 4,941,361 | 7/1990 | Lew | 73/861.24 |
| 5,537,860 | 7/1996 | Haertl | 73/54.14 |

Primary Examiner—James P. Trammell
Assistant Examiner—Cuong H. Nguyen
Attorney, Agent, or Firm—Weiner, Carrier, Burt & Esser, P.C.; William F. Esser; Irving M. Weiner

[57] ABSTRACT

An apparatus for calculating fluid flow in a channel, comprising a probe member which detects fluid depth in the channel; a mechanism for measuring average fluid velocity in the channel; a mechanism for correcting the detected fluid depth based upon the measured average fluid velocity in order to account for drawdown; and a mechanism for calculating average flow rate based upon the average fluid velocity measurement and the corrected fluid depth value.

20 Claims, 3 Drawing Sheets

FLUID FLOW MEASUREMENT CORRECTING SYSTEM, AND METHODS OF CONSTRUCTING AND UTILIZING SAME

BACKGROUND OF THE INVENTION

1. Field of Invention

The present invention relates to a system for measuring parameters relating to fluid flow in a channel, and in particular to a system which provides an accurate measurement of average fluid flow rate which takes into account the effect of drawdown.

Flow of material through a partially filled channel or pipe is expressed by the equation $$Q=A*V,$$

where Q represents the rate of flowable material through the channel; V represents the average velocity of material in the channel; and A represents the cross-sectional area of material in the channel, or wetted cross-sectional area. For a channel or pipe having a substantially circular cross-section, the wetted cross-sectional area may be expressed as $$A=R^2 * \cos^{-1}((R-L)/R)-(R-L)*(2*R*L-L^2)^{.5},$$

where R represents the actual channel or pipe radius and L represents the depth of the flowable material in the channel (FIG. 3). It is noted that similar equations exist for calculating the wetted cross-sectional area of channels having different cross-sectional shapes. As a result, an accurate measurement of the depth of flowable material in the channel is essential in determining flow through a partially filled channel.

Pressure sensitive devices exist which, when placed in a fluid channel, determine fluid depth by measuring the pressure exerted on the device due to the fluid overhead. Once the fluid pressure is measured, fluid depth L may be calculated as $$L=27.681*P,$$

where P represents the measured pressure acting on the probe, in psi.

Pressure sensitive devices which measure fluid depth in a channel are often placed in a stilling well—a calm, isolated area which is adjacent a stream of flowing fluid and which has a fluid level which is substantially the same as the fluid level in the stream. In some instances, however, the pressure sensitive devices are placed directly into the stream of flowing fluid, in which case their fluid depth measurements are affected by a phenomenon known as drawdown.

Drawdown is caused by the presence of objects in the stream of fluid flow. Specifically, drawdown is an effect that occurs in nonhydrostatic conditions in which the pressure exerted on the probe by the flowing fluid is actually less than the ambient pressure in the stream due to the stream lines of flow being disturbed by the probe. If the presence of the probe causes any disturbance in the stream lines of flow (FIG. 4), drawdown occur regardless of the streamlined nature of the probe. With the pressure sensitive probe measuring fluid pressure that is less than the actual ambient pressure in the stream of fluid, fluid depth in the channel is under-represented, thereby leading to an inaccurate flow rate computation. The present invention is directed at substantially eliminating the inaccuracies associated with fluid depth measurements by taking into consideration the effects of drawdown.

2. Description of the Relevant Art

There are known probes which measure fluid flow. For example, U.S. Pat. No. 5,506,791 discloses a multi-functional device having a pressure sensitive probe for measuring fluid depth in a channel.

The above-identified reference, however, fails to disclose or otherwise suggest a system for measuring fluid velocity in a channel which takes into account the effects of drawdown.

SUMMARY OF THE INVENTION

The present invention overcomes the above-discussed shortcomings of prior fluid flow measuring devices and satisfies a significant need for accurately registering fluid level by considering the effects of drawdown acting on pressure sensitive devices.

According to the invention, there is provided a fluid flow rate measurement system, comprising a submerged probe member having a means for determining fluid depth in a channel; a means for measuring average fluid velocity in the channel; a means for correcting the fluid depth determination to account for drawdown conditions acting on the probe member; and a means for calculating average fluid flow rate based upon the fluid depth correction and the average fluid velocity measurement.

In use, the probe member is first analyzed in order to determine and record the extent of drawdown acting thereon over a range of fluid velocities. Next, the probe member is placed within the fluid channel and connected to the fluid depth determining means. Thereafter, the probe member measures fluid pressure and transmits the measured pressure data to the determining means for computing fluid depth. The fluid velocity measuring means transmits average fluid velocity measurements to the fluid depth correcting means so that it computes a fluid depth value which accounts for drawdown. The flow rate calculating means then computes average fluid flow rate based upon the average fluid velocity measurement and the corrected fluid depth value.

It is an object of the present invention to provide a system which accurately measures fluid flow rate in a channel.

Another object of the present invention in to provide such a system which considers the effect of drawdown in measuring average fluid flow rate.

It is another object of the present invention to provide a system which provides accurate fluid flow rate measurements in real time.

Other objects, advantages and salient features of the present invention will become apparent from the following detailed description, which, when taken in conjunction with the annexed drawings, disclose preferred embodiments of the present invention.

DETAILED DESCRIPTION OF THE PREFERRED EMBODIMENTS

Referring to FIGS. 1–7, there is shown a fluid flow rate measuring system according to the preferred embodiments of the present invention, comprising a submerged probe member; a means for measuring average fluid velocity in a channel; a means for determining fluid depth in the channel; a means for correcting the determined fluid depth based upon the average fluid velocity measurement in order to account for drawdown; and a means for calculating fluid flow rate based upon the average fluid velocity measurement and the corrected fluid depth.

Probe member 1 preferably comprises a pressure sensitive device, such as a bubbler-type probe (FIG. 2) in which the probe housing is isolated from the fluid flow and tubing is connected between the housing and the channel in which fluid flows for measuring fluid pressure therefrom; or a pressure transducer probe (FIG. 1) which is directly placed into the fluid stream. Alternatively, probe member 1 may suitably comprise other submerged measuring devices which measure fluid levels in a channel.

Figure 1:
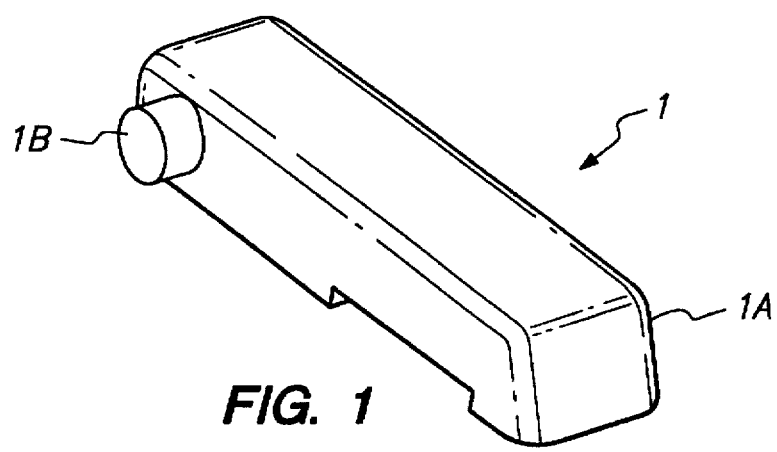
FIG. 1 is a perspective view of a probe member of the present system.
Figure 2:
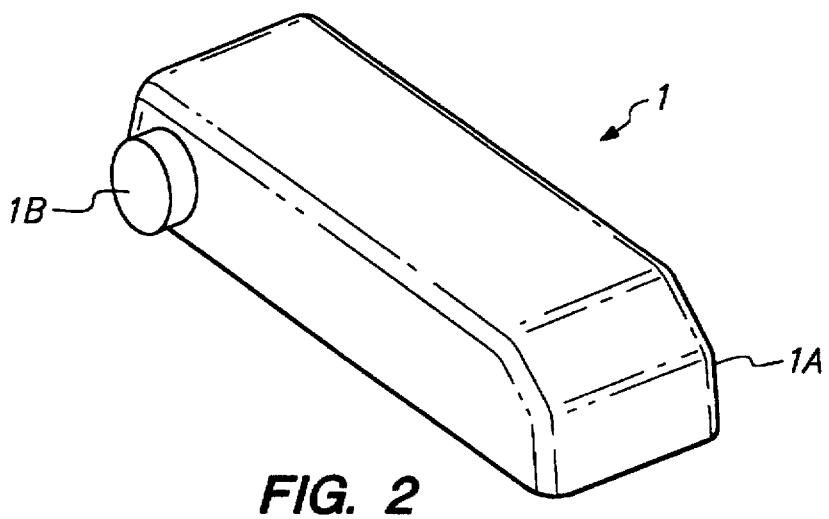
FIG. 2 is a perspective view of another probe member of the present system.
Figure 3:
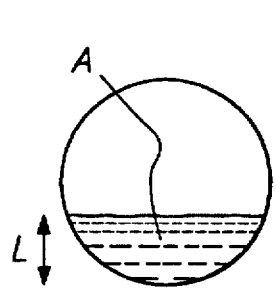
FIG. 3 is a cross-sectional view of a closed channel in which fluid flow is to be measured.
Figure 4:
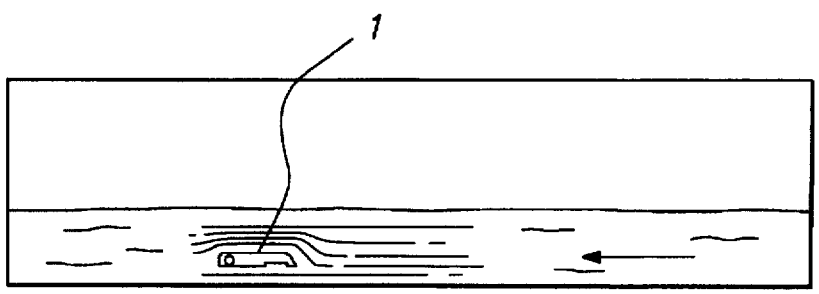
FIG. 4 is a side elevational view of a closed channel having there a preferred embodiment of the present invention.

In a preferred embodiment of the present invention, probe member 1 is sized and shaped in order to minimize any disturbance in fluid flowing in the channel. As shown in FIGS. 1, 2 and 4, probe member 1 is preferably elongated having a curved end 1A which faces upstream when placed within the channel. Probe member 1 measures fluid pressure acting thereon and transmits the measurement to the fluid depth determining means. Wire end 1B extends from probe member 1 in order to provide electrical communication to the determining means.

Figure 7:
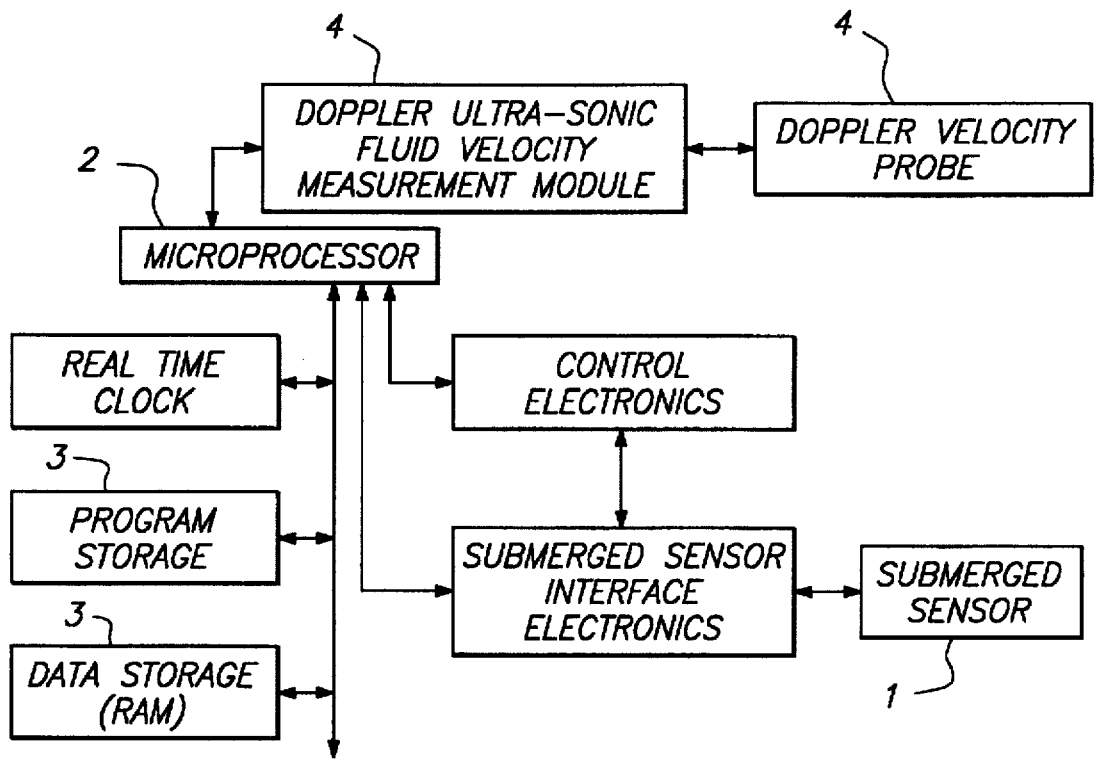
FIG. 7 is a block diagram showing components of some of the preferred embodiments of the present invention.

The present invention preferably but not necessarily includes computing means for performing arithmetic operations relating to calculating fluid depth, average fluid velocity, average flow rate and drawdown effects on fluid depth. As shown in FIG. 7, the computing means preferably but not necessarily comprises microprocessor 2 having, among other things, an arithmetic logic unit for performing arithmetic and boolean logic operations; memory 3 for storing both data and program instructions, comprising both random access memory (RAM) and read only memory (ROM); and interface and control circuitry for suitably connecting microprocessor 2 to fluid level measuring devices, fluid velocity measuring devices, signal processing circuitry, etc. Alternatively, the computing means of the present comprise other arithmetic processing devices.

The fluid depth determining means receives electrical signals from probe member 1 corresponding to the measured fluid pressure in the channel, and calculates fluid depth L using the equation identified above. In a preferred embodiment of the present invention, the fluid depth determining means comprises software stored in memory 3 which cooperates with microprocessor 2 in translating measured fluid pressure to fluid depth, as shown in FIG. 7. The fluid depth determining means preferably calculates fluid depth in real time, but alternatively the fluid depth determining means stores the raw fluid pressure measurements in memory 3 for processing at a later time.

According to a preferred embodiment of the present invention, the fluid velocity measuring means measures the average velocity of the fluid flowing in the channel. As shown in FIG. 7, the velocity measuring means preferably but not necessarily comprises software stored in memory 3 which suitably cooperates with microprocessor 2; and sensing unit 4 which is suitably connected to microprocessor 2.

Sensing unit 4 of the fluid velocity measuring means preferably but not necessarily comprises one or more piezo-electric transducers which transmit and receive high frequency signals, such as ultrasonic signals; and signal processing circuitry, operably associated with microprocessor 2, for controlling the transducers and measuring the Doppler frequency shift between the transmitted and received signals, including amplifiers, mixing circuits, filters, and a spectrum analyzer. Microprocessor 2 and memory 3 preferably cooperate with the signal processing circuitry in recording and calculating the average fluid velocity in the channel. Alternatively, sensing unit 4 comprises circuitry which utilizes principles other than Doppler principles in measuring average fluid velocity. In a preferred embodiment of the present invention, the fluid velocity measuring means measures average fluid velocity substantially in real time.

The flow rate calculating means preferably computes average flow rate in the channel according to the equation:

*Average Flow Rate=Average Velocity×A* where A is the wetted cross-sectional area which is dependent upon fluid depth and channel geometry information as described above. In a preferred embodiment of the present invention, the flow rate calculating includes software stored in memory 3 which utilizes microprocessor 2, memory 3 and associated control and interface circuitry in calculating average flow rate. In a preferred embodiment of the present invention, the flow rate calculating means computes average flow rate in real time.

According to the preferred embodiments of the present invention, the flow rate measuring system includes a means for correcting measured fluid depth in order to account for the drawdown effect. The correcting means preferably but not necessarily comprises a correcting factor which adjusts or offsets the raw fluid depth measurement so as to account for drawdown.

Since the effect of drawdown on an object varies depending upon fluid velocity in the stream, the correcting means in a preferred embodiment of the present invention adjusts the raw fluid depth measurement as a function of the average fluid velocity measurement. Once corrected, the adjusted fluid depth value, together with the measured average fluid velocity value, is used to calculate flow rate in the channel, using the equation for average flow rate indicated above.

In a preferred embodiment of the present invention, the correcting means adds a correction factor to offset the raw fluid depth measurement. The correcting means preferably but not necessarily comprises an equation that represents the drawdown effect for the particular probe member 1 that is used to measure fluid depth. The correcting means preferably comprises system software which cooperates with microprocessor 2, memory 3 and necessary control and/or interface circuitry so that the drawdown correction equation is accessed from memory 3, the fluid depth offset value is calculated based upon the measured average fluid velocity value, and the offset fluid depth value is thereafter added to the raw fluid depth value. The correcting means preferably but not necessarily adjusts the raw fluid depth value substantially in real time.

Figure 5:
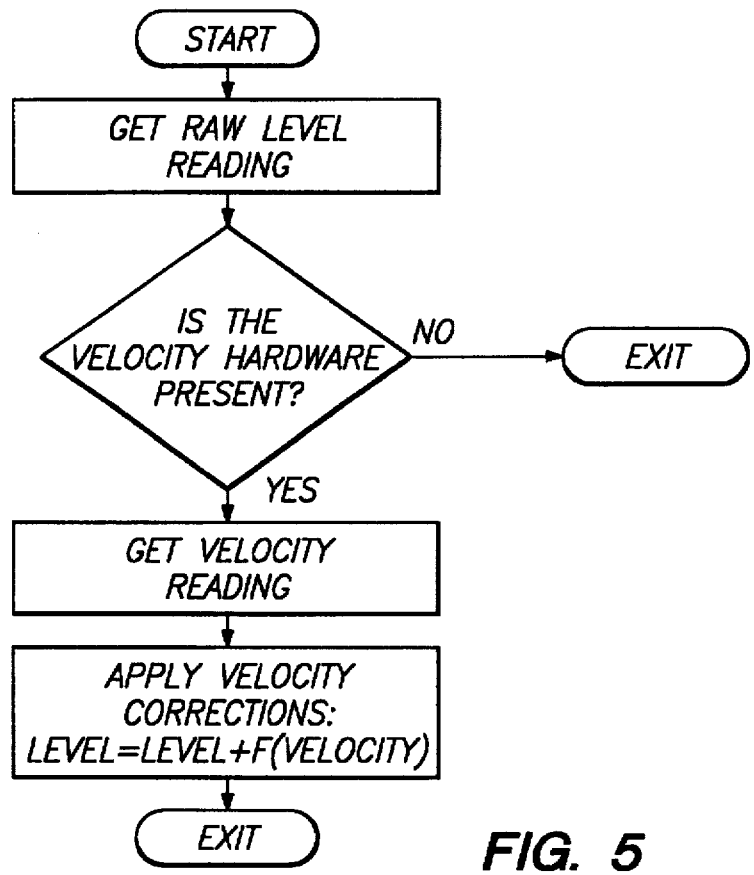
FIG. 5 is a flowchart depicting the correcting means of a preferred embodiment of the present invention.

In addition, the correcting means preferably but not necessarily includes system software and necessary control circuitry to retrieve the raw fluid depth value from either memory 3 or the fluid depth determining means and to check to see if the fluid velocity measuring means is connected into the system. If the fluid velocity measuring means in not connected so that an average fluid velocity measurement is unavailable, then the correcting means does not calculate or apply an offset fluid depth value in order for the flow rate calculating means to calculate average flow rate. A flowchart representing the operation of the correcting means is shown in FIG. 5.

Figure 6:
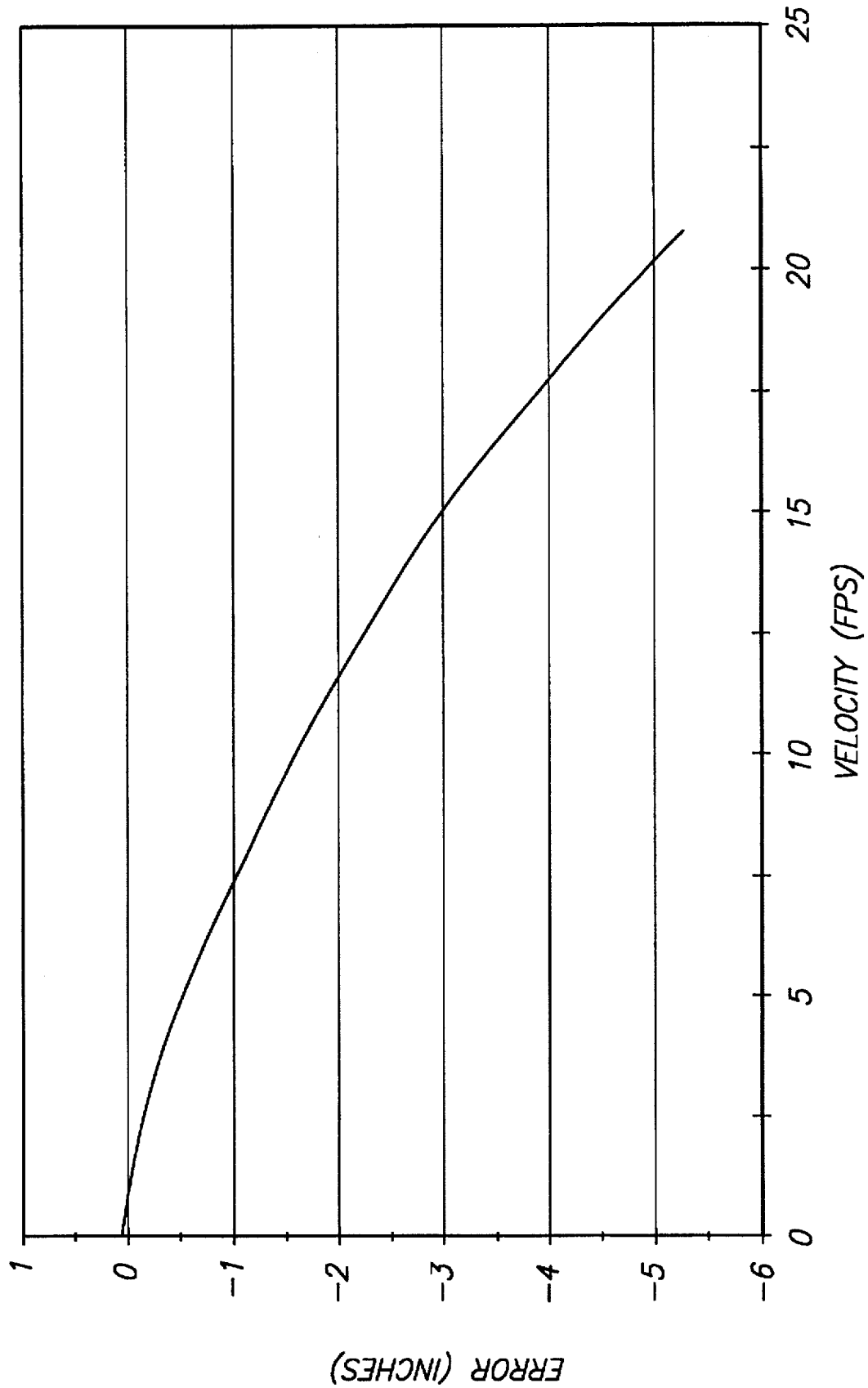
FIG. 6 is a graph showing the relationship between measured average fluid velocity and fluid level error due to drawdown, for a probe member of the present system.

The fluid depth offset equation representing the drawdown effect is preferably but not necessarily derived from an analysis of the particular probe member 1 used in the system. The particular probe member 1 is analyzed at a plurality of fluid velocities so that an accurate drawdown profile for the probe member is obtained. The test results are then curve fitted, such as by using a least squares approximation, in order to derive a drawdown equation from the test data points. In one preferred embodiment of the present invention, the offset fluid depth equation is a second order equation. A graph showing the fluid depth offset curve as a function of fluid velocity for a probe member 1 is shown in FIG. 6.

In an alternative embodiment, the fluid depth offset values are stored directly in memory 3 rather than an equation being derived therefrom and stored in memory 3 instead. In this way, the measured average velocity value is used as the address pointer for the appropriate fluid depth offset value when the correcting means adjusts the measured fluid depth value.

Installation and operation of the system is as follows. First, probe member 1 is placed into position in the channel. Next, probe member 1 is connected to microprocessor 2 and/or memory 3 via interface circuitry in order to communicate with the fluid depth determining software. Sensing unit 4 of the fluid velocity measuring means is inserted into the channel and is connected to microprocessor 2 and/or memory 3 via interface circuitry so that it can communicate with the fluid level correcting means software and the flow rate calculating means software.

Once the system is installed, probe member 1 measures fluid pressure acting thereon and transmits the measured data to microprocessor 2 and/or memory 3; and the fluid depth determining software computes fluid depth, based upon this data. Concurrently, sensing unit 4 measures average fluid velocity and transmits the measured data to microprocessor 2 and/or memory 3. Thereafter, the flow rate correcting software computes the fluid level offset value based upon the average fluid velocity measurement and adjusts the fluid depth measurement accordingly. Next, the flow rate calculating software computes average flow rate in the channel based upon the average fluid velocity measurement and the adjusted fluid depth value.

Prior to being used in the system, probe member 1 is initially analyzed by measuring for drawdown at a plurality of different velocities and by deriving a formula representing the relationship between fluid level error due to drawdown and fluid velocity.

Although there have been described what are currently considered to be the preferred embodiments of the present invention, it will be understood that the invention can be embodied in other specific forms without departing from the spirit or essential characteristics thereof.

The described embodiments are, therefore, to be considered in all aspects as illustrative, and not restrictive. The scope of the invention is indicated by the appended claims rather than the foregoing description.

I claim:

1. A method for measuring fluid flow in a channel, comprising the steps of:

obtaining a probe;

obtaining a computing means having stored therein drawdown data for said probe;

placing said probe in a channel where fluid flow is to be measured;

determining fluid depth in said channel with said probe;

correcting said fluid depth determination based upon said drawdown data using said computing means; and calculating fluid flow rate based upon said corrected fluid depth determination using said computing means.

2. A method as recited in claim 1, including the steps of:

measuring drawdown effects for said probe at a plurality of fluid velocities; and storing said drawdown effect measurements for said probe in said computing means.

3. A method as recited in claim 2, wherein:

said drawdown storing step comprises the steps of curve fitting said drawdown measurements and storing an equation representing said curve fitted drawdown measurements in said computing means.

4. A method as recited in claim 3, including the steps of:

measuring average fluid velocity in the channel; and recording said fluid velocity measurements in said computing means.

5. A method as recited in claim 4, wherein:

said drawdown equation provides fluid level error as a function of fluid velocity; and said correcting step comprises the step of providing said fluid level error as an offset to said fluid depth determination.

6. A method as recited in claim 4, further including the step of:

verifying that said fluid velocity measurement and said fluid velocity recording step have been completed before executing said correcting step.

7. A method as recited in claim 4, wherein:

said fluid depth correcting step and said flow rate calculating step execute substantially in real time.

8. A method as recited in claim 3, wherein:

said curve fitting step utilizes a least squares approximation.

9. A method as recited in claim 1, wherein:

said correcting step occurs in real time following said fluid depth determining step.

10. An apparatus for calculating fluid flow in a channel, comprising:

a probe member having means for detecting a fluid level in the channel;

means for measuring fluid velocity in the channel;

means for correcting said fluid level detection to account for drawdown conditions acting on said probe member; and means for calculating average fluid flow rate based upon said fluid velocity measurement and said corrected fluid level.

11. An apparatus as recited in claim 10, wherein:

said correcting means provides an offset fluid level value based upon said fluid velocity measurement.

12. An apparatus as recited in claim 11, wherein:

said apparatus includes computing means and associated memory; and said correcting means comprises an equation stored in said memory, wherein said equation represents said offset fluid level value as a function of said fluid velocity as measured by said velocity measuring means.

13. An apparatus as recited in claim 11, wherein:

said apparatus includes computing means and associated memory;

said correcting means comprises a plurality of offset fluid level values being stored in said memory; and said fluid velocity measurement is used to point to one of said offset fluid level values in said memory for correction of said fluid level detection.

14. An apparatus as recited in claim 10, wherein:

said correcting means corrects said fluid level detection substantially in real time.

15. An apparatus as recited in claim 10, wherein:

said probe member comprises a pressure transducer.

16. A device for measuring fluid parameters in a channel, comprising:

means for measuring a fluid level in the channel;

memory means for storing drawdown data pertaining to said fluid level measuring means;

means for correcting said fluid level measurement based upon said drawdown data; and means for calculating fluid flow rate based upon said corrected fluid level measurement.

17. A device as recited in claim 16, wherein:

said memory means stores drawdown data pertaining to said fluid level measuring means at a plurality of fluid velocities.

18. A device as recited in claim 17, further including:

means for measuring fluid velocity in the channel; and wherein said correcting means corrects said measured fluid level based upon fluid velocity measured by said velocity measuring means.

19. A device as recited in claim 18, wherein:

said drawdown data comprises an equation for calculating a fluid level offset value based upon measured fluid velocity; and said fluid level offset value is added to said measured fluid level by said correcting means.

20. A device as recited in claim 16, wherein:

said correcting means and said flow rate calculating means occur substantially in real time following said fluid level measurement.

* * * * *

UNITED STATES PATENT AND TRADEMARK OFFICE
CERTIFICATE OF CORRECTION

PATENT NO. : 5,691,914
DATED : November 25, 1997
INVENTOR(S) : Gary Randolph

It is certified that error appears in the above-indentified patent and that said Letters Patent is hereby corrected as shown below:

Column 1, line 59, after "drawdown" insert --will--.

Column 5, line 2, change "in" to --is--.

Signed and Sealed this

Twenty-fourth Day of February, 1998

Attest:

BRUCE LEHMAN

Attesting Officer     Commissioner of Patents and Trademarks